United States Patent

Chang

[11] Patent Number: 5,579,056
[45] Date of Patent: Nov. 26, 1996

[54] DIGITAL MULTI-STANDARD TV COMPOSITE VIDEO ENCODER FOR HIGH COLOR RESOLUTION TV GAME

[75] Inventor: Albert Yi-Long Chang, Yu-HO, Taiwan

[73] Assignee: Syntek Design Technology Limited, Taiwan

[21] Appl. No.: 237,596

[22] Filed: May 3, 1994

[51] Int. Cl.⁶ ........................................ H04N 5/46
[52] U.S. Cl. .......................... 348/555; 348/556; 348/557
[58] Field of Search ..................... 348/441, 488, 348/492, 496, 555, 558, 706; H04N 5/46

[56] References Cited

U.S. PATENT DOCUMENTS

| | | | |
|---|---|---|---|
| 4,962,427 | 10/1990 | Lunn et al. | 348/558 |
| 5,111,160 | 5/1992 | Hershberger | 348/558 |
| 5,325,131 | 6/1994 | Penney | 348/556 |
| 5,389,974 | 2/1995 | Bae | 348/558 |

FOREIGN PATENT DOCUMENTS 60267  10/1981  Taiwan .

*Primary Examiner*—Victor R. Kostak
*Attorney, Agent, or Firm*—Ladas & Parry

[57] ABSTRACT

A digital multi-standard TV composite video encoder is provided for converting digital RGB signals, such as those generated by high color resolution TV game machines, into analog composite video signals that can be accepted by TV systems of various standards including NTSC-M, NTSC 4.43/50, NTSC 4.43/60, PAL-B/G/I/D, PAL-M, and PAL-N. The present invention integrates encoder and TV game machine in a single chip of integrated circuit, which employs only one single crystal oscillator and three jump lines for selection of the six standards.

9 Claims, 9 Drawing Sheets

DIGITAL MULTI-STANDARD TV COMPOSITE VIDEO ENCODER FOR HIGH COLOR RESOLUTION TV GAME

BACKGROUND OF THE INVENTION

The present invention relates to composite video encoders, and more particularly, to a composite video encoder capable of converting digital RGB (red, green, and blue) signals such as generated by high color resolution TV game machines into analog composite video signals that can be accepted by TV systems of any of several standards including NTSC-M, NTSC 4.43/50, NTSC 4.43/60, PAL-B/G/I/D, PAL-M and PAL-N.

Specifications of the above-mentioned six standards are listed in the Table 1.

Prior Art ROC Patent No. 60267 teaches a multi-standard composite video encoder, which produces poor image quality with high cost circuits.

Accordingly, it is a primary objective of the present invention to provide a digital multi-standard TV game composite video encoder that avoids the disadvantages in the prior art.

To achieve the foregoing objective, the digital multi-standard TV game composite video encoder according to the present invention is provided for use with high color resolution TV game machine. The encoder is combined with part of the game machine in an integrated circuit having peripheral components including:

- a crystal oscillator chip, a second capacitor, and three jump lines for selection of any one of the above six different NTSC and PAL systems;

- first capacitor of fixed capacitance for use in a phase-locked circuit filtering;

- a switching circuit and first and second resistors for selection of signals to produce SVHS signals having separation between luminance and chrominance signals or composite video signals having combined luminance and chrominance signals;

- a third resistor for controlling current flow a in digital-to-analog converter; and

- a third capacitor and a fourth capacitor for use as filters in an analog power source and;

and encoder having a portion in the integrated circuit, which comprises:

- an RGB color difference signal converter, that accepts the RGB signals generated by the game machine, a negative blanking signal, and video sampling clock signal for converting the RGB signals respectively into a composite luminance signal, a red weighted color difference signal, and a blue weighted color difference signal;

- a multi-system signal generator for generating four four-quadrant subcarrier and chrominance-sampling clock signals, and generating a horizontal phase-lock reference signal for a phase-lock loop circuit;

- a composite chrominance signal generator that combines the blue weighted color difference signal and red weighted color difference signal with a composite color burst gate signal and four-quadrant subcarrier to generate a composite chrominance signal containing color burst;

- a bandpass filter that accepts the composite chrominance signal for producing a band-limited composite chrominance signal;

- a first digital-to analog converter for converting the band-limited composite chrominance signal into an analog current signal to build up an analog composite chrominance signal on the second resistor outside the integrated circuit;

- a synchronization signal inserter that accepts the luminance signal and the composite synchronization signal from the game machine for producing a composite luminance signal containing a composite synchronization signal;

- a low-pass filter that accepts the composite luminance signal for producing a band-limited composite luminance signal;

- a time delay circuit for matching the timing between the band-limited composite luminance signal and the band-limited composite chrominance signal;

- a second digital-to-analog converter for converting the time matched composite luminance signal into an analog current signal to build up an analog composite luminance signal on the first resistor outside the integrated circuit; and

- a phase-locked loop circuit that uses the horizontal synchronization signal generated by the game machines for phase-locking with the horizontal phase-locking reference signal generated by the multi-system signal generator a, to thereby generate high frequency clock signal required by the game machine and maintain a fixed ratio between the chrominance subcarrier frequency and horizontal synchronization signal frequency to reduce the visibility of subcarrier interference.

BRIEF DESCRIPTION OF THE DRAWINGS

The present invention can be more fully understood by reading the subsequent detailed description of preferred embodiments thereof with reference to the accompanying drawings, wherein.

BRIEF DESCRIPTION OF THE TABLES

TABLE 1 shows the specifications of six TV systems;

TABLE 2 shows the settings for the crystal oscillator frequency and three jump lines in different TV systems;

TABLE 3 shows the technical data related to the generation of NTSC and PAL color signals; and TABLE 4 shows the frequencies of signals in each TV system when the system is phase locked.

DETAILED DESCRIPTION OF PREFERRED EMBODIMENTS

Figure 1:
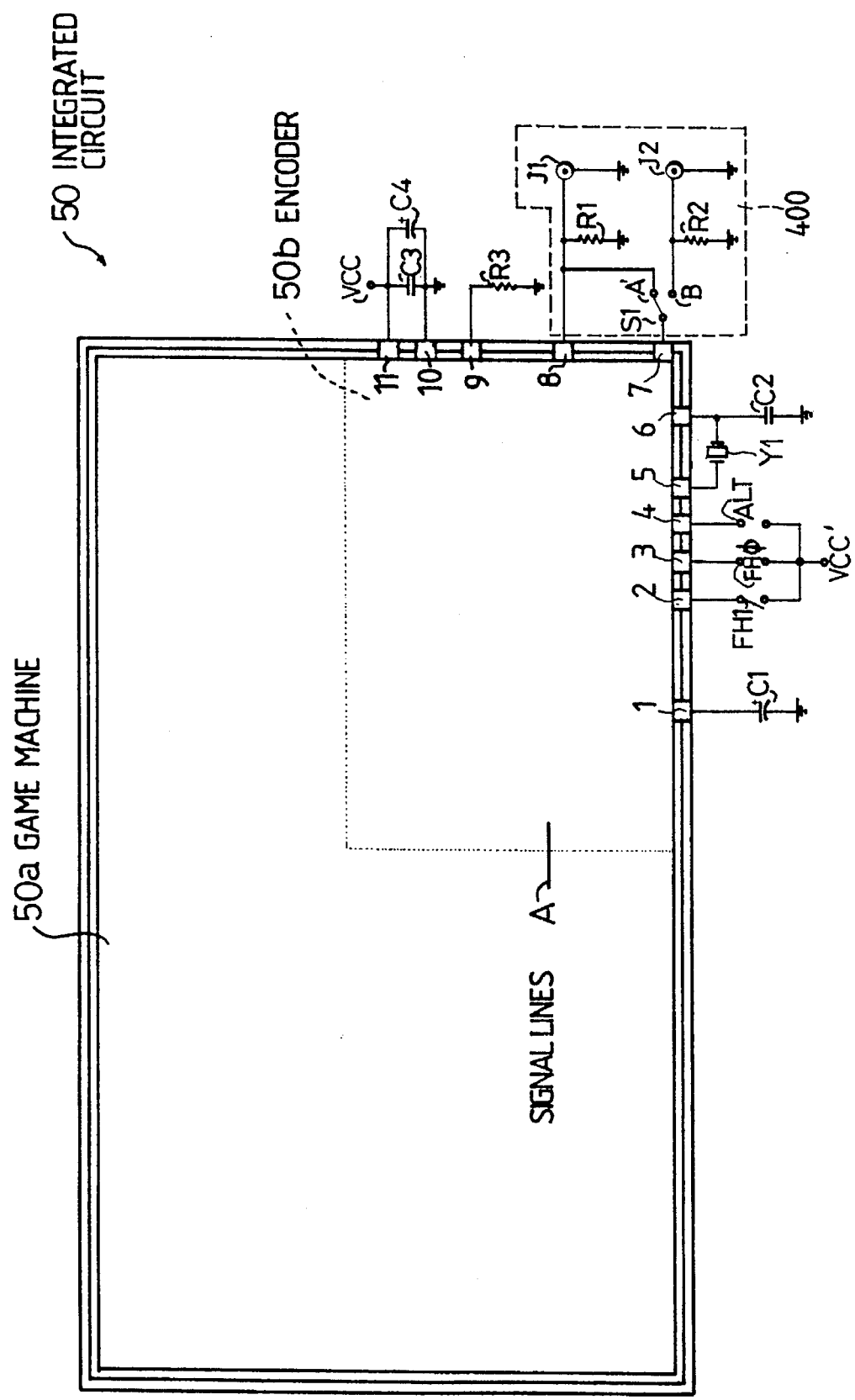
FIG. 1 is a schematic circuit diagram showing the integration of a TV game machine and a multi-standard composite video encoder on a single chip integrated circuit.

Referring to FIG. 1 the portion that is framed by three solid bold lines represents a single chip integrated circuit that integrates a game machine 50a and an encoder 50b according to the present invention. The solid line designated by "A" represents signal lines between the game machine 50a and the encoder 50b. Its functions will be described later in this section.

On the border of the encoder 50b, those blocks designated by the numerals 1 through 11 represent the pins of the integrated circuit 50. The encoder 50b according to the present invention requires only eleven (11) pins to connect with external circuits. Besides this 11-pin component, all the rest components are peripherals required for the encoder 50b.

A capacitor C1 is connected to pin 1, which has a constant capacitance and is used for phase-lock filtering. Jump lines FH1, FHφ, and ALT, which are connected with pins 2 to 4, are used for selection of system standards. Connected with pin 5 and 6 are a crystal chip Y1 and a capacitor C2, which combine to form an resonant circuit.

This resonant circuit further combines with an inverter in the integrated circuit 50 to form an oscillator. The oscillation frequency is dependent on the resonant frequency of the crystal chip Y1. Pin 7 is the output port of the composite chrominance signal, which contains the burst signal. Pin 8 is the output port of the composite luminance signal, which contains the composite sync signal. Pin 7 is connected with a switch S1, whose toggle positions determine an output of the SVHS-signal with separation of chrominance and luminance signals from the terminals J1 or J2, or an output of the composite video signal also from the terminal J1. A first resistor R1 and a second resistor R2 are provided, both having a resistance of 75 Ω allowing the outputs from Pin 7 and Pin 8 to be coupled directly to a 75 Ω transmission line and onwards to the A/V terminal or SVHS terminal on the TV set. When the switch S1 is toggled at a position connected to the first contact A, the first terminal J1 in the switching circuit 400 sends out a composite video signal. On the other hand, when the switch S1 is toggled to another position connected to the second contact B, the first terminal J1 sends out a composite luminance signal and the J2 terminal sends out a composite chrominance signal, which together form an SVHS signal with separation of luminance and chrominance. Pin 9 is used for bias setting and is connected with a third resistor R3. The resistance of the third resistor R3 determines the current level in the digital-to-analog converter (DAC) used to generate luminance and chrominance signals. Pin 10 is the grounding line used by the digital-to analog converter. The 5 V power line VCC used to supply power to the digital-to-analog converter and Pin 10 and Pin 11 is from an analog-dedicated power source, which is separated from the digital-dedicated power source VCC so as to avoid interference between the digital and analog signals. The numerals C3 and C4 respectively designate a third capacitor and a fourth capacitor used in the analog power source for filtering.

The selection among the multiple system standards is determined by settings of the jump lines FH1, FHφ, and ALT and the tuning frequency of the crystal chip Y1, as indicated in Table 2.

In Table 2, when the jump line FH1, FHφ or ALT is shown as φ, it indicates that the jump line is not connected. Since a pull-low circuit is provided in the integrated circuit, the potentials at the corresponding pins 2, 3 and 4 are all zero. When the jump line FH1, FHφ, or ALT is 1, it indicates that the jump line is connected. Potentials at corresponding pin 2, 3 and 4 are therefore 5 V.

Figure 2A:
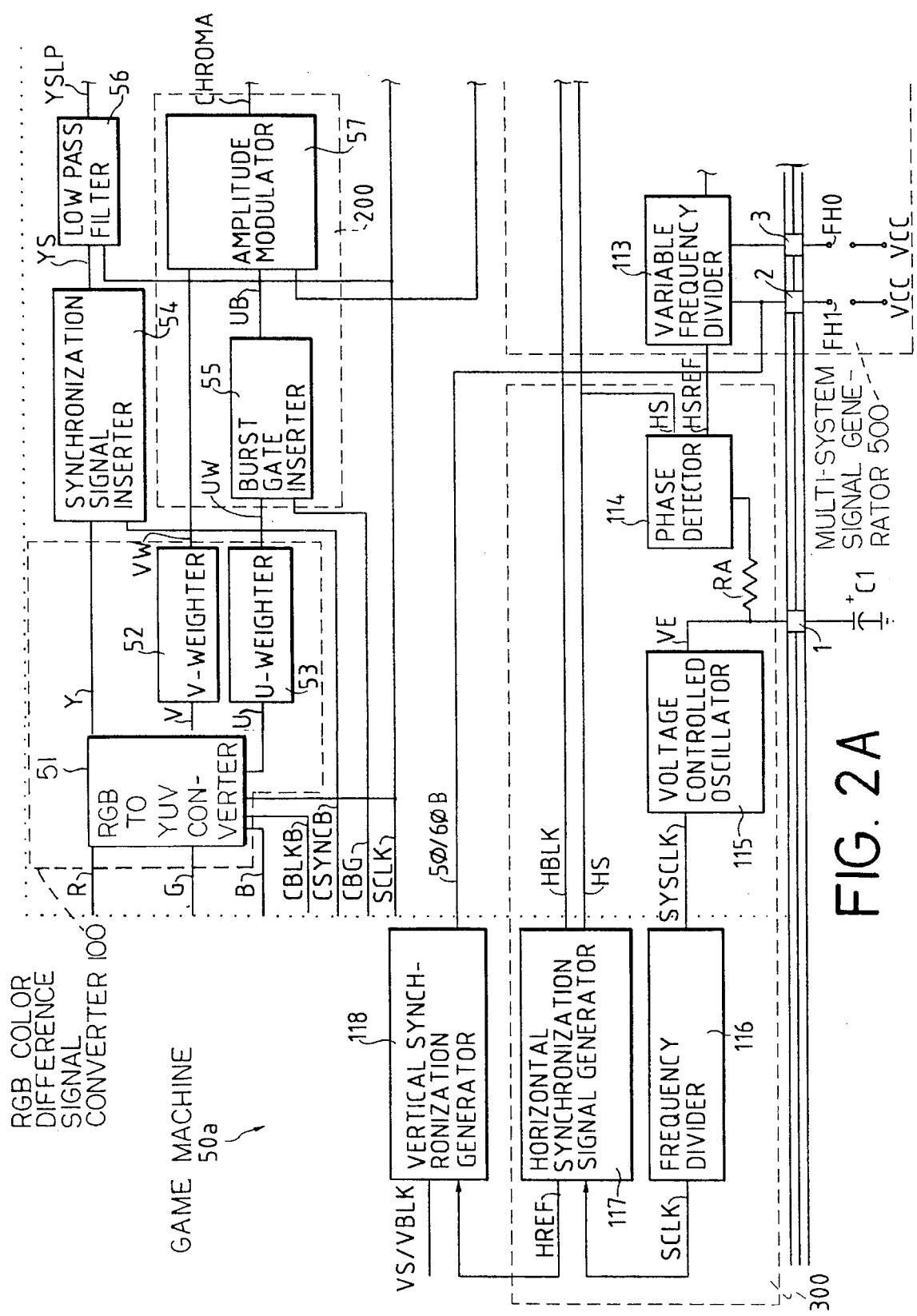
FIGS. 2A and 2B are a block diagram showing a multi-standard composite video encoder.
Figure 2B:
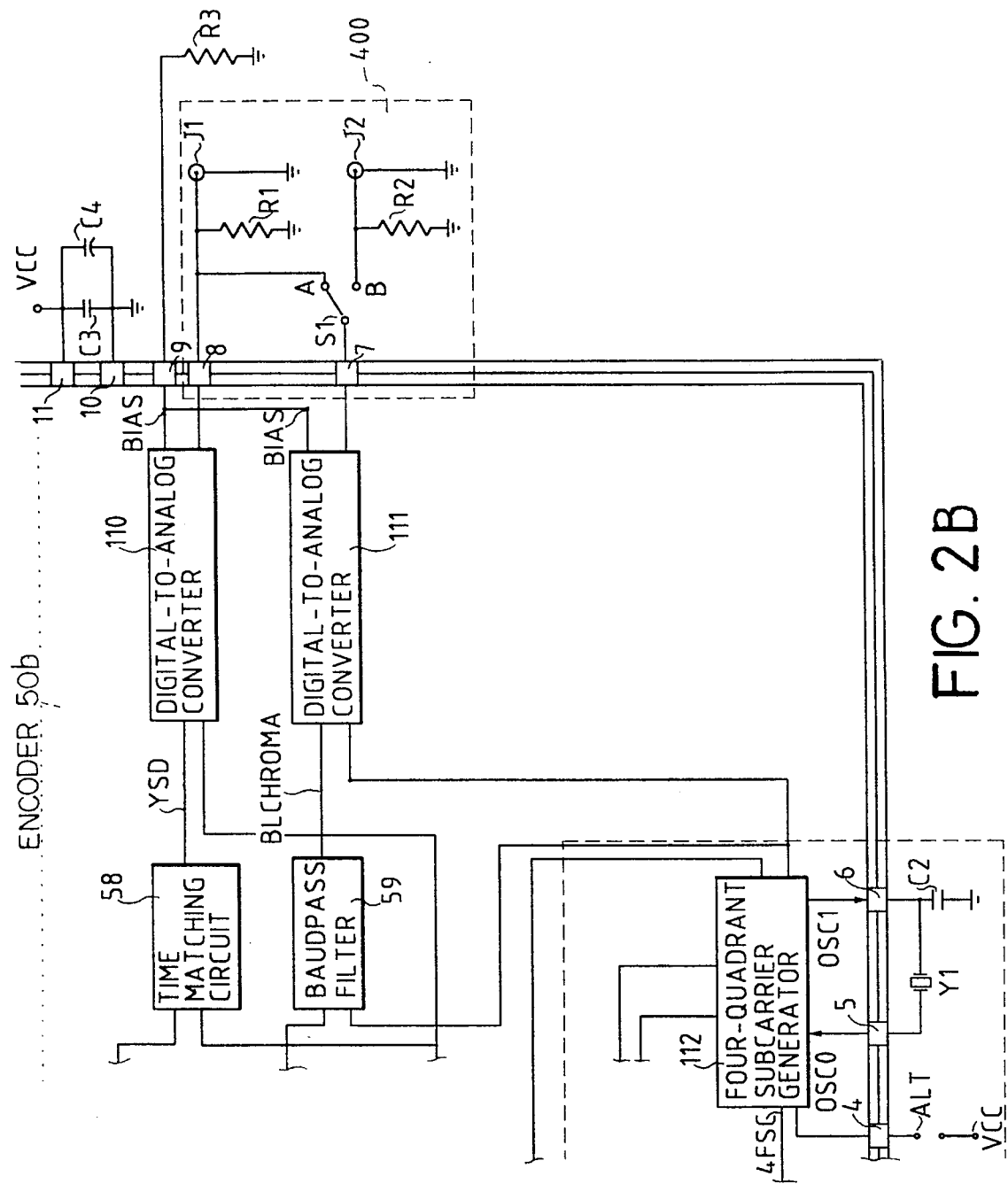

FIG. 2A and 2B show a detailed block diagram of the multi-standard composite video signal encoder 50b according to the present invention. The numeral 100 denotes a RGB color difference signal converter which is composed of an RGB-to-YUV converter 51, V-weighter 52, and a U-weighter 53. In FIGS. 2A and 2B, lines that are connected with the dotted lines on the left are signal lines included in the line set A shown in FIG. 1.

The lines that are designated by "R", "G", and "B" are digital signal lines with N digits used to transmit signals of the three additive primary colors. The RGB signals are sent to the RGB-to-YUV converter 51.

The RGB-to-YUV converter 51 converts RGB signals into YUV signals in accordance with the following equations:

$$Y = 3R + 6G + B \quad (1)$$

$$U = 10B - Y \quad (2)$$

$$V = 10R - Y \quad (3)$$

Eqs. (1), (2), and (3) are obtained by rounding up the result of multiplying Y=0.3R+0.59G+0.11B ten times.

Figure 3:
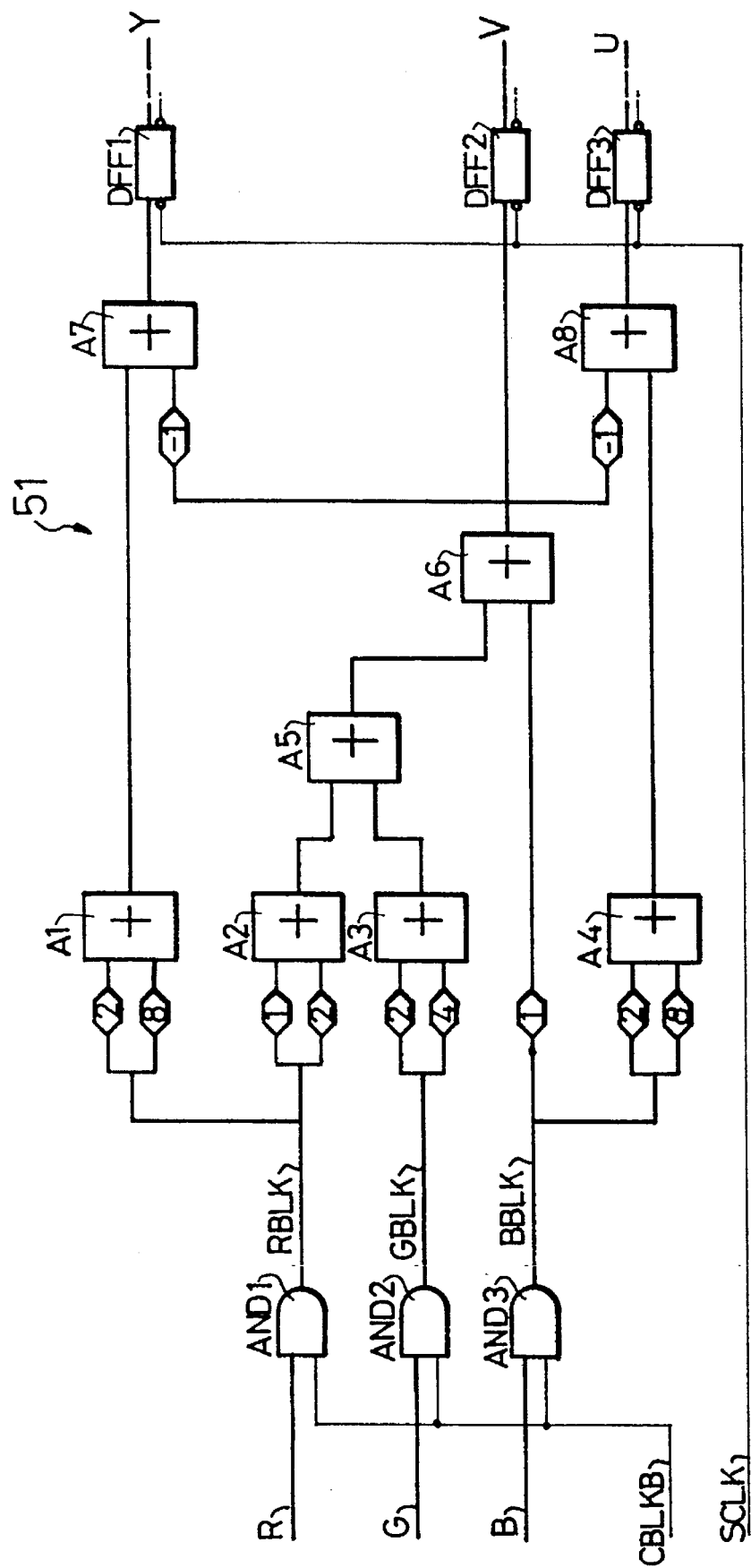
FIG. 3 is a circuit diagram showing a RGB-to-YUV converter.

The Circuit of the RGB-to-YUV converter 51 is disclosed in FIG. 3. In FIG. 3, digital RGB signals are zeroed by negative composite blanking signal CBLCK by means of AND gates AND1, AND2, and AND3 into signals RBLK, GBLK, and BBLK with zero value during the blanking period. The latter signals are processed by adders A1 through A8 to carry out the conversion according to Eqs. (1), (2), and (3). The resulted YUV signals are then sampled in three D-type flip-flops DFF1, DFF2, and DFF3 with a clocked sampling signal SCLK so as to synchronize the YUV signals, thereby producing converted output signals of Y, U and V.

As shown in FIG. 2, after being processed by the RGB-to-YUV converter 51, the resulted color difference U signal, and color difference V signal are respectively sent to U-weighter 53 and V-weighter 52.

The value of weight added to the U and V signals is obtained in accordance with the following FCC (Federal Communications Committee of USA) specified equation.

$$Em = Ey + \{1/1.14[1.78 * Eu * \sin(wt) + Ev * \sin(wt)]\} \quad (4)$$

This equation is applied to composite signals Em with frequencies below 500 Hz.

From Eq.(4), it can be determined that the weight value for blue color difference signal Eu is 1/1.14*1/1.78=1/2.0292; and that for the red color difference signal Ev is 1/1.14=0.87719.

These values are rounded to the nearest values that are best suitable for use in computation of digital signals. The weight value of 0.5 is thus assigned for the blue color difference signal and the weight value of 0.875 is assigned for the red color difference signal.

Therefore, the V-weighter 52, used as on adder, multiplies the V signal by 0.875, and the U-weighter 53, used as an adder, multiplies the U signal by 0.5.

The relationship is shown below.

$$VW = 0.875 \, V \quad (5)$$

$$UW = 0.5 \, U \quad (6)$$

In FIG. 2A, the weighted blue color difference signal UW is sent into the burst gate inserter 55 of the composite chrominance signal generator 200. In the burst gate inserter 55 the, composite burst gate signal CBG generated by game machine 50a is ORed with the signal UW, thereby embedding burst gate signal of +8 amplitude. This +8 burst gate appended blue color difference signal UB is subsequently modulated in the amplitude modulator 57 of the composite chrominance signal generator 200 by a sub-carrier signal 4QSUB with the same phase as the burst signal. The resultant signal is a burst signal having an amplitude of ±8.

In FIG. 2A, the amplitude modulator 57 uses a four-quadrant sub-carrier signal to concurrently amplitude modulate the red color difference signal VW and the burst gate appended blue color difference signal UB to produce a composite chrominance signal CHROMA that contains color burst.

Figure 4:
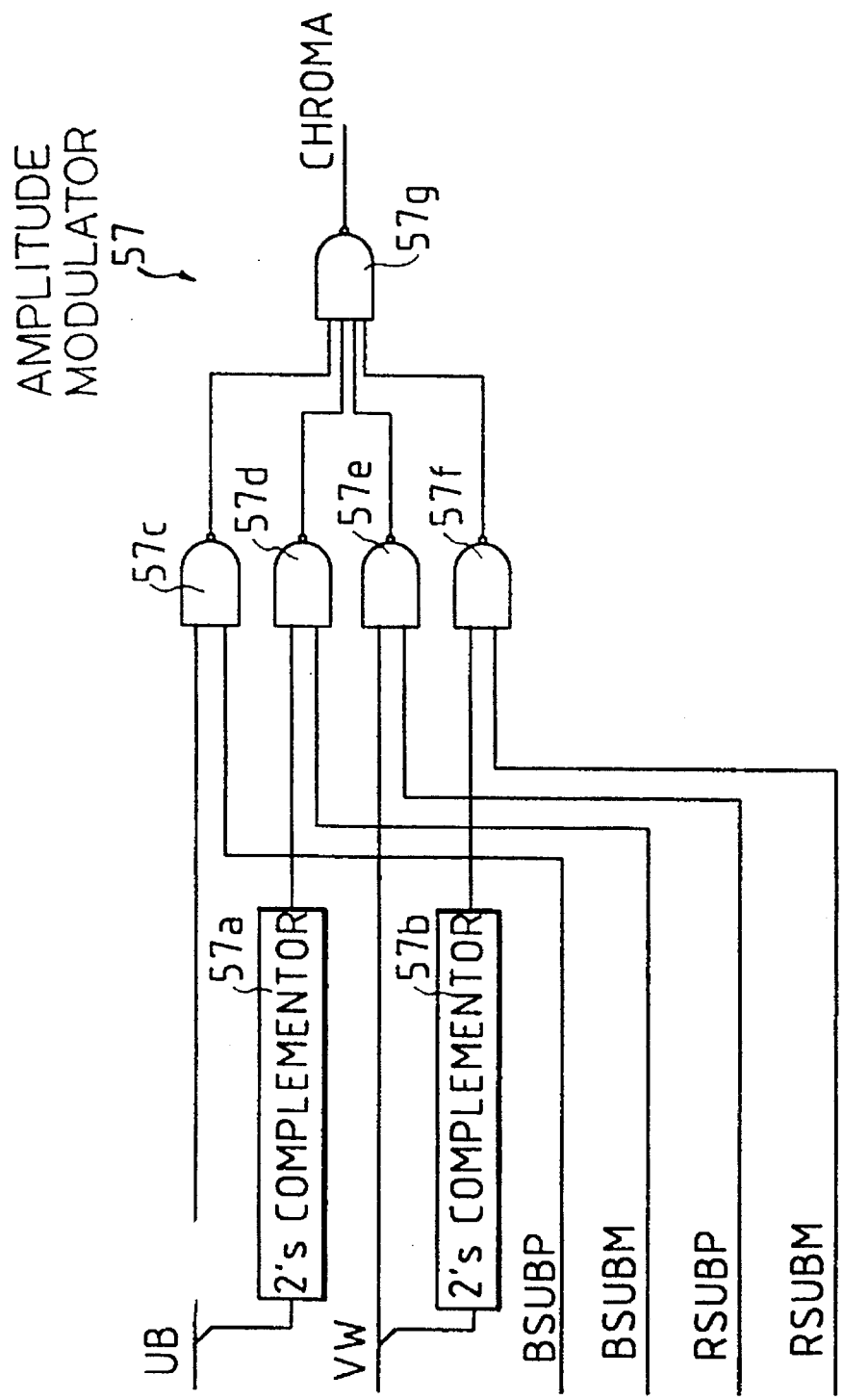
FIG. 4 is a circuit diagram showing a digital four-quadrant amplitude modulator.

The circuit of the amplitude modulator 57 is disclosed and shown in FIG. 4, which is called a digital 4Q AM modulator. In FIG. 4, signals UB and VW are 2's complement signals having positive and negative values, which are input respectively to NAND gate 57c and NAND gate 57e. A first 2's complementor 57a and a second 2's complementor 57b then convert the signals UB and VW respectively into -UB and -VW, which are subsequently sent into NAND gate 57d and NAND gate 57f. The other input ports of the NAND gates 57c–57f are controlled by four-quadrant sub-carrier signals 4QSUB respectively labeled with BSUBP, BSUBM, RSUBP, and RSUBM. The four-quadrant sub-carrier signal 4QSUB is generated by four-quadrant sub-carrier generator 112 shown in FIG. 2.

Figure 5:
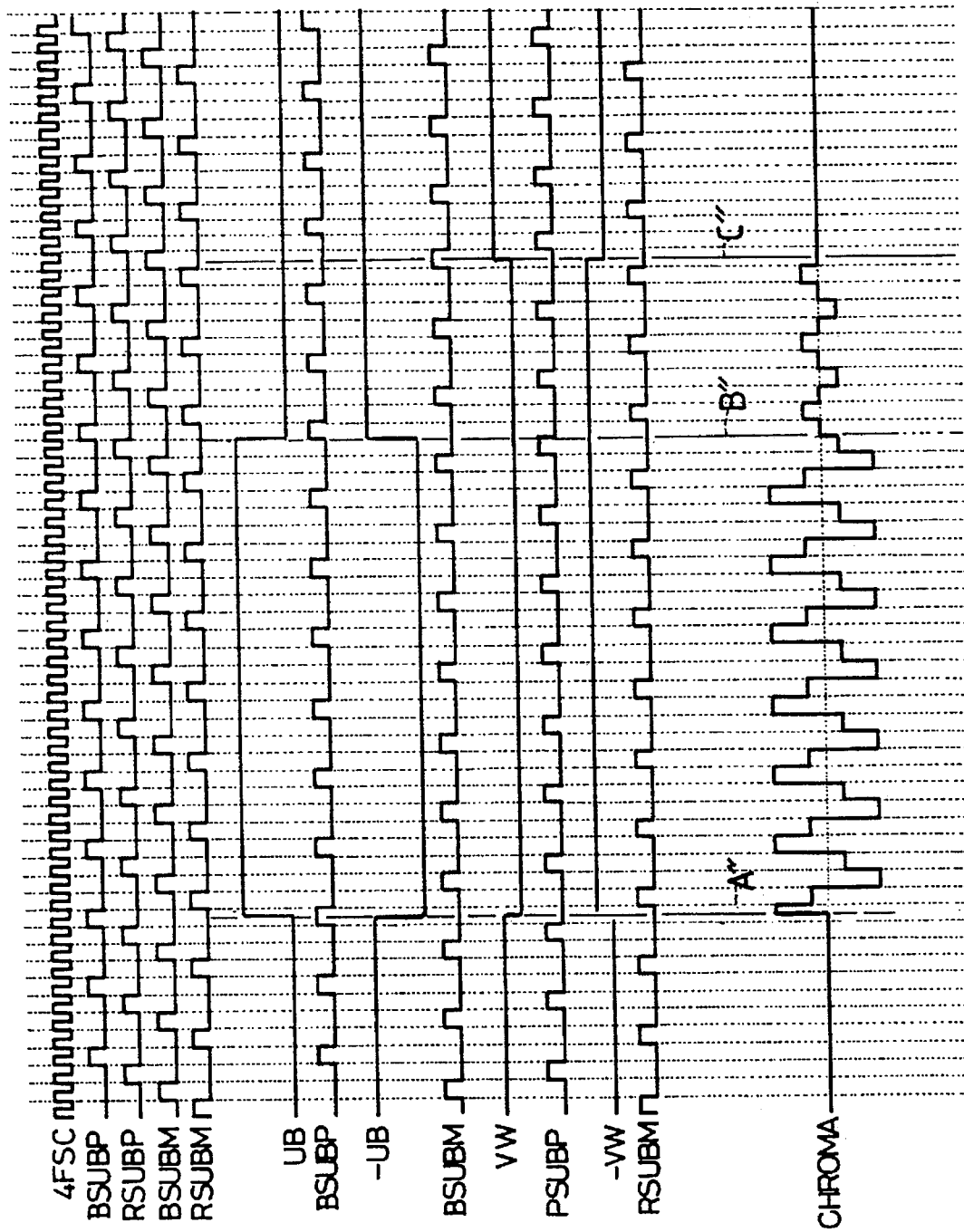
FIG. 5 is a waveform diagram showing the waveforms of signals generated by the four-quadrant amplitude modulator.

The operating principle of the digital four-quadrant amplitude modulator 57 shown in FIG. 4 will be described with reference to FIG. 5. In FIG. 5, the signal designated by 4FSC is the clock signal of quadruple frequency of the chrominance sub-carrier signal, which causes the generation of four-quadrant sub-carrier signals BSUBP, RSUBP, BSUBM, and RSUBM, each of which occupies one quadrant and has the frequency of the chrominance sub-carrier. When the signal BSUBP is positive, only the signal UB is output at the output port CHROMA shown in FIG. 4. Accordingly from this, the color difference signals UB and VW are controlled by the four-quadrant sub-carrier signal and selected sequentially by the signals UB, VW, -UB, and -VW for the output line. The resultant signals is an amplitude-modulated signal CHROMA as shown in FIG. 5.

In FIG. 2, the amplitude-modulated composite chrominance signal is sent into a bandpass filter 59 having a center frequency of the chrominance sub-carrier. The bandpass filter 59 uses a sampling clock signal CSCLK generated by the four-quadrant sub-carrier signal generator 112. The transfer function of the filter 59 is:

$$H(Z)=¼*(1-Z^{-2})^2 \tag{7}$$

The output of the filter 59 is designated by BLCHROMA, which is sent into a first digital-to-analog converter 111. The digital-to-analog converter 111 is a current-type converter, which generates a first current in proportion to the value of the received digital signal. The first current flows via Pin 7 into the first 75 Ω resistor R1 or the second 75 Ω resistor R2 on the outside of the integrated circuit 50b, thereby building up an analog voltage across the resistor. The level of the first current can be adjusted through the bias point BIAS by means of adjusting the third resistor R3 coupled to Pin 9.

In FIG. 2, the luminance signal Y generated by the RGB-to-YUV converter 51 is sent into the synchronization signal inserter 54. In the synchronization signal inserter 54, a negative composite synchronization signal generated by game machine 50a is added by adders to the luminance signal Y to produce a composite luminance signal YS having sync. amplitude of 14.

In FIG. 2, composite luminance signal YS is sent into a low-pass filter 56. The transfer function of the low-pass filter is:

$$H(Z)=¼+½*Z^{-1}+¼*Z^{-2} \tag{8}$$

The sampling clock signal is designated by SCLk, which is used to sample the luminance signal and is different in frequency from the sampling clock signal CSCLK for chrominance signal. Detailed explanation will be given later in this section. The composite luminance signal YSLP sent out from the low-pass filter 56 is subsequently sent into a time matching circuit 58, which is a delay circuit that makes the timing of the luminance signal in synchronization with the chrominance signal. After being matched in timing, the composite luminance signal YSD is sent into a second digital-to-analog converter 110. The second digital-to-analog converter 110 is also a current-type converter identical in circuit structure with the first digital-to-analog converter 111. The bias of the second digital-to-analog converter 110, like that of first the digital-to-analog converter 111, is controlled by the third resister R3 coupled to Pin 9. The current gains in both are therefore the same.

The current of the analog composite luminance signal sent out from the second digital-to-analog converter 110 flows into the first resistor R1, resulting in the generation of a composite luminance signal. The switching circuit 400 includes switch S1, first resistor R1, second resistor R2, first terminal J1, and second terminal J2. When the switch S1 is toggled at the contract position A, the current of the composite chrominance signal also flows into the first resistor R1. As a consequence, the composite chrominance signal and composite luminance signal are summed up in the first resistor R1 to form a composite video signal sent out from the terminal J1. When the switch S1 is toggled to position B, the composite luminance signal and the composite chrominance signal are respectively built up in the first resistor R1 and the second resistor R2. The resultant signal SVHS with separation of luminance and chrominance is sent out from the terminals J1 and J2.

Figure 6:
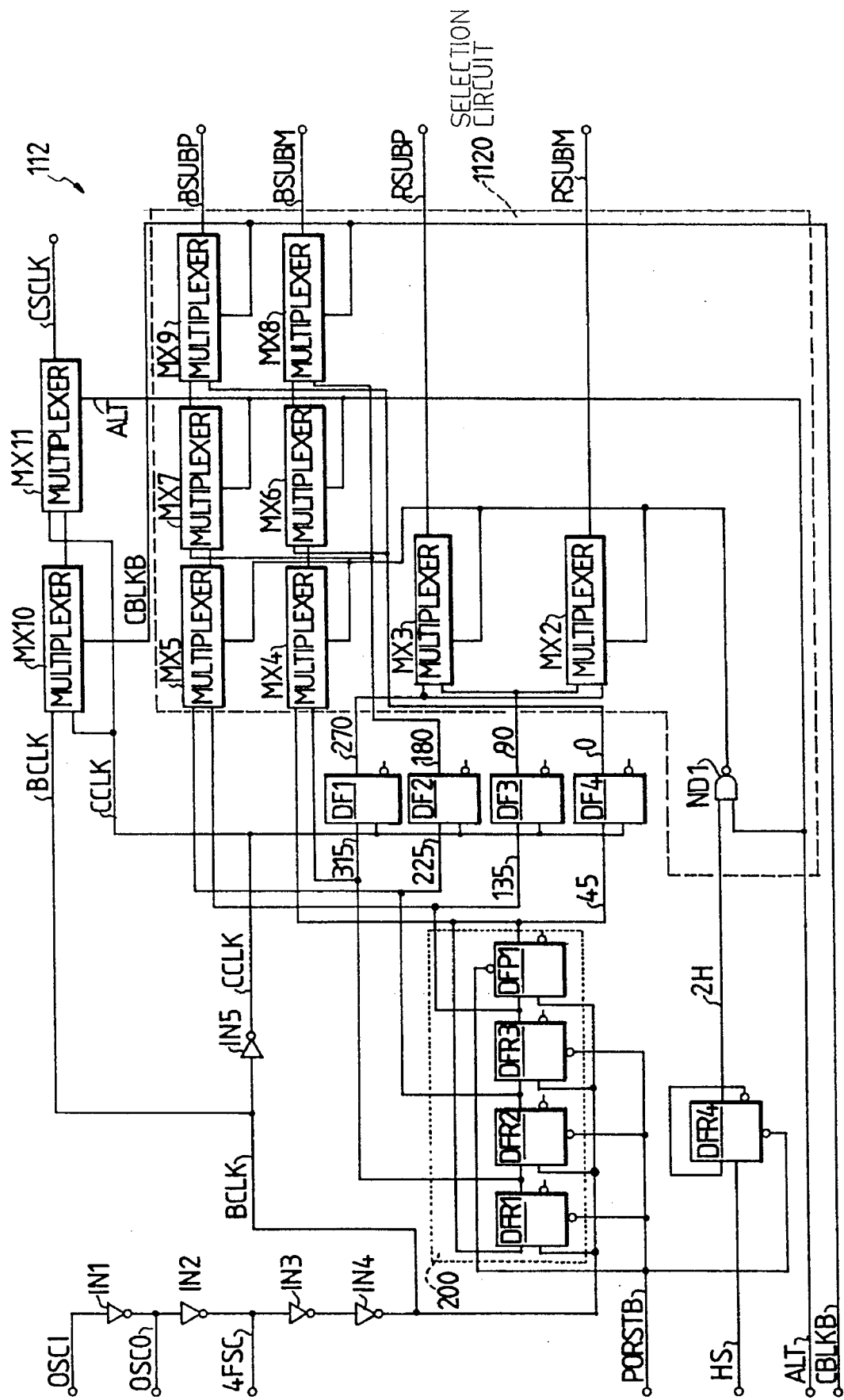
FIG. 6 is a circuit diagram showing a four quadrant sub-carrier signal generator.

The circuit of the four-quadrant subcarrier generator 112 shown in FIG. 2 is disclosed and shown in FIG. 6. In FIG. 6, the input signal OSCI and the output signal OSCO of the first inverter IN1 are coupled via Pin 5 and Pin 6 into the integrated circuit shown in FIG. 2 for which the crystal chip Y1 and second capacitor C2 forms the crystal oscillator. The oscillation frequency is determined by the crystal chip Y1.

The frequency generated by the multi-standard composite video encoder 50b according to the present invention is the frequency of the quadruple chrominance subcarrier. As shown in Table 2, in TV systems of different standards, frequencies of the crystal chip y1 are respectively 14.31818 MHZ, 17.734476 MHZ, 14.302444 MHZ, and 14.328248 MHZ. After dividing these frequencies by four (4), the chrominance subcarrier will have frequencies specified by each TV system standards, as those given in Row 3 of Table 1:3.579545 MHZ, 4.433619 MHZ, 3.575611 MHZ, 3.582062 MHZ.

Figure 7:
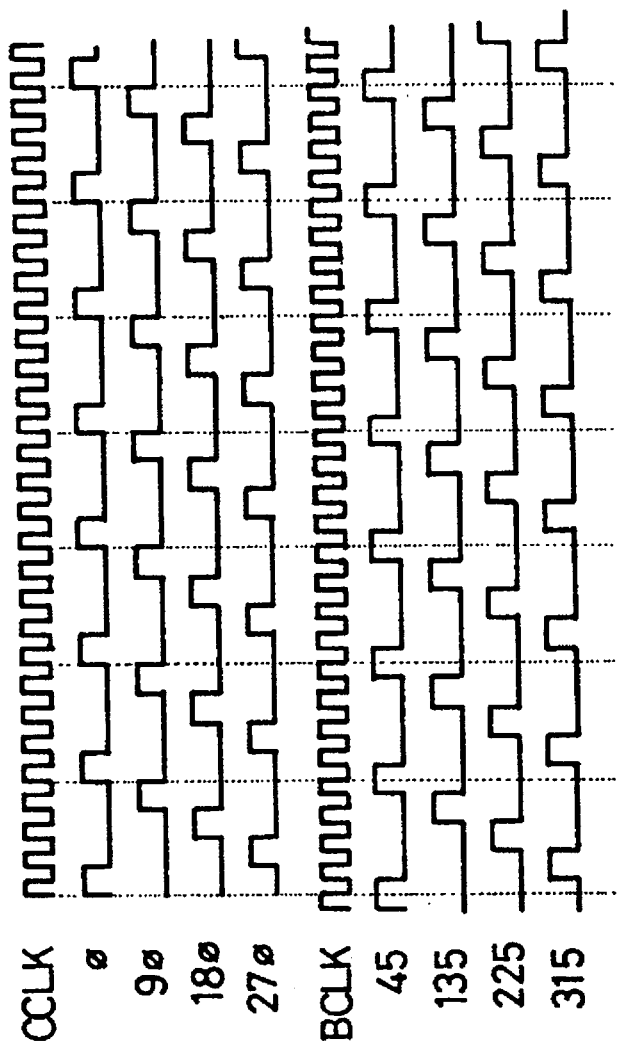
FIG. 7 is a waveform diagram showing the waveforms of eight sub-carrier signals of different phases.

In FIG. 6, the quadruple subcarrier frequency signal of the output OSCO is shaped by the second inverter IN2 into a square waveform and then sent via the line labeled with 4FSC to a variable frequency divider 113 in the multi-system signal generator 500 shown in FIG. 2. The signal is further boosted by third and fourth inverters IN3 and IN4 to produce a clock signal designated as BCLK. A ring counter 200 is composed of a first reset flip-flop DFR1, a second RESET flip-flop DFR2, a third reset flip-flop DFR3, and a preset flip-flop DFP1. The three flip-flop DFR1, DFR2, and DFR3 are provided with RESET function and the preset flip-flop is provided with PRESET function. Driving by the clock signal BCLK, the ring counter 200 generates four four-quadrant subcarrier signals respectively designated by the numerals 45, 135, 225, and 315, each of which occupies one quadrant active time. At the time the ring counter 200 is just power on, it must be reset by the signal PORSTB in order to be able to generate four consecutive four-quadrant subcarrier signals. The waveforms of the signals 45, 135, 225, and 315 are shown in FIG. 7.

Four D-type flip-flops respectively labeled with DF1, DF2, DF3, and DF4 are used to shift the phase angles of the four signals 315, 225, 135, and 45 by 45°. The resultant four-quadrant subcarrier signals are respectively designated by 270, 180, 90, and 0. The generation of these signals is a result of edge triggering by means of the clock signal CCLK generated by the fifth inverter IN5. To maintain accurately a 45° phase difference between two neighboring four-quadrant subcarrier signals, the signal BCLK must be a square wave with a duty cycle of 50%. The waveforms of these two sets four-quadrant subcarrier signals are both shown in FIG. 7.

In FIG. 6, horizontal synchronization signal HS passes through the eighth D-type with reset flip-flop DFR4 to be divided by two (2). An alternation signal 2H having a frequency half that of the signal HS is thus produced. In PAL application, the alternation signal 2H is used to allow the burst and red (R) subcarrier phase to be alternated by every other lines.

The alternate signal 2H together with the aforementioned two sets four-quadrant signals, after being selection controlled by the alternation control signal ALT and the negative composite blanking signal CBLKB in a selection circuit 1120 composed of first NAND gate ND1 and second to ninth 2-to-1 multiplexers MX2 to MX9, cause the generation of four-quadrant subcarrier signals BSUBP, BSUBM, RSUBP, and RSUBM to control the four-quadrant amplitude modulator 57 in FIG. 2. In FIG. 2, the four signals are collectively designated as subcarrier signal 4QSUB.

In FIG. 6, the 2-to-1 multiplexers MX10 and MX11 allow the two clock signals BCLK and CCLK to be controlled by the signals ALT and CBLKB to generate chrominance sampling clock signal CSCLK.

The status of the signal CSCLK and BSUBP, BSUBM, RSUBP, and RSUBM is indicated in Table 3. Table 3 is particularly for explaining how the four-quadrant subcarrier signal and composite chrominance signal are generated.

In Table 3, when the alternation signal is set at $\phi$, the encoder 50b is set for generating the constant-phase chrominance signal for use in the NTSC TV system. When ALT=$\phi$, there exists two modes of signal processing: blanking and non-blanking. During the blanking period, CBLKB=$\phi$; and during the non-blanking period, CBLKB=1.

Checking on the first row of Table 3, when ALT=0, CBLK=0, and 2H=X, the blue subcarrier signals BSUBP and BSUBM are four-quadrant signals having 180° and 0° phase angles respectively; whereas the red subcarrier signals RSUBP and RSUBM are both four-quadrant signals having 90° and 270° phase angles respectively.

Since the blanking period includes the appearance period of the burst, the blue color difference signal UB and red color difference signal VW and the composite chrominance signal CHROMA column in Table 3 is divided into two regions. The top portion is the region where non-burst appears, and the bottom portion is the region where burst appears. In the UB column, the top portion is designated by $\phi$, indicating that the blue color difference signal UB has zero amplitude during the blanking period in which non-burst signal appears. The bottom portion is designated by +8, indicating that during the burst period, the value of the digital blue color difference signal UB has an equivalent amplitude of +8. As shown in FIG. 2, the amplitude +8 is inserted by the burst gate signal in the burst signal inserter 55. Inserting +8 amplitude is a consequence of the fact that the composite video signal generated through the processing according to the present invention has a synchronization signal with an amplitude of 14 and the maximum amplitude of luminance signal is 38.

Through the blanking period, the red color difference signal VW remains at $\phi$. Therefore, in the VW column, the top and bottom portions are indicated by $\phi$.

During the blanking period in which non-burst signal appears, since UB−VW=$\phi$, the composite chrominance signal CHROMA generated by the digital amplitude modulator 57 has an amplitude of $\phi$. However, during the period in which the burst signal appears, VW=$\phi$. This signal together with the signals RSUBP and RSUBM cause the generation of a CHROMA signal having zero amplitude; whereas when UB=+8, this signal together with the signals BSUBP and BSUBM cause the generation of a burst signal having an amplitude of 16 and a phase angle of 180°. In Table 3, this is indicated in the bottom portion of the CHROMA column as 16/180.

Figure 8:
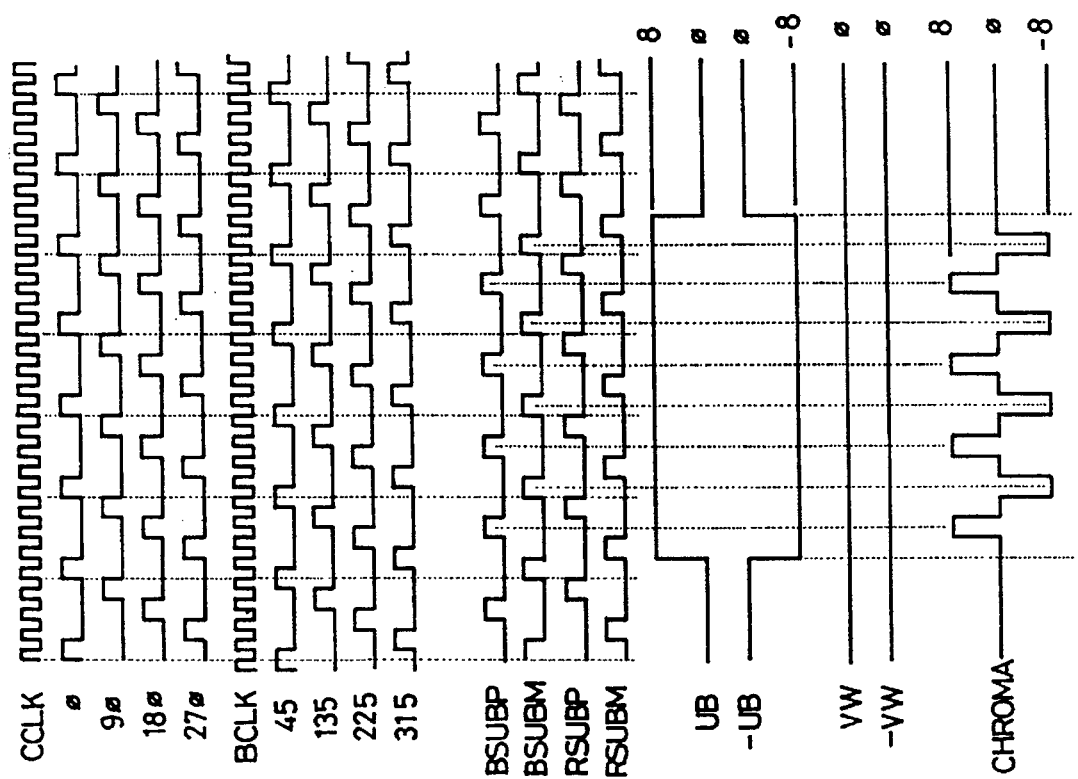
FIG. 8 is a waveform diagram, showing the generation of color burst signals.

In the aforementioned method of generating the burst signal, the resultant waveform diagram is shown in FIG. 8. In FIG. 8, the ten signals CCLK through 315 from top to bottom repeat the ten signals shown in FIG. 7. In FIG. 8, the signals BSUBP, BSUBM, RSUBP, and RSUBM represent signals selected during the blanking period, which have phase angles of 180°, 0°, 90° and 270° respectively UB and −UB represent the signal having +8 amplitude, which is embedded during the blanking period in which the burst signal appears; meanwhile the signal VW and −VW have zero amplitude. When these signal input to the digital amplitude modulator shown in FIG. 4, the signal CHROMA as shown in FIG. 8 is generated. However, its waveform is the burst signal that appears during the blanking period.

In the second row of Table 3, ALT=0, CBLKB=1, 2H=X. This represents the non-blanking period in which the image is displayed on the screen.

The phase selected by the blue subcarrier signals BSUBP and BSUBM is different by 180° from that selected during the blanking period; whereas the phase selected by the red subcarrier signal RSUBP and RSUBM is the same as that selected during the blanking period.

Since amplitudes of the blue and red color difference signals UB and VW are uncertain during the period of image display, variables UB and VW are used to represent them in the UB and VW columns. The chrominance signal produced during this period is denoted by UB/$\phi$+VW/90. Such denotation signifies that the blue color difference signal UB is attached onto zero-phase subcarrier signals by means of amplitude modulation. The denotation VW/90 signifies that the red color difference signal VW is attached onto the red subcarrier signal having 90° phase angle by means of amplitude modulation. UB/$\phi$+VW/90 represents the summation of UB/$\phi$ and VW/90 by means of the amplitude modulator 57 shown in FIG. 4. Its waveform in the time domain is shown in FIG. 5. In FIG. 5, the waveforms appearing in the interval delimited by the bold lines A" and B" and another interval delimited by the bold lines B" and C" represent two different waveforms of the CHROMA signals triggered by different values of UB and VW. Outside the two intervals, UB=VW=φ, so that the signal CHROMA is also zero. In Table 3, when the alternation control signal ALT is 1, the composite video signal encoder 50b generates chrominance signals having the phase used in the PAL system that alternates in every other horizontal line. Therefore, the horizontal line alternation signals 2H is in effect, resulting in two operating conditions 2H=φ or 2H=1. The principle of the selection of subcarrier and amplitude modulation is the same as when ALT=φ, except that the selected phase is different.

To check on the column of composite chrominance signal CHROMA, let 2H=φ represent even numbered horizontal lines. In the blanking period, CBLKB=φ, and the CHROMA amplitude in the non-burst appearance period is zero, because UB=φ and VW=φ. However, in the blanking period the burst appearance period the burst in the CHROMA has an amplitude and phase of 16 and 225 degree is selected. This is indicated by 16/225 in the bottom portion of the CHROMA column. During the period of image display, and the CHROMA is UB/φ+VW/27φ. If 2H=1 represent odd-numbered horizontal lines, the blanking period, CBLKB=φ, and the burst amplitude and phase is 16 and 135° as indicated in the CHROMA column as 16/135. The amplitude of the CHROMA in the blanking period of non-burst appearance period is φ. In the image display period, CBLKB=1, the amplitude and phase of the CHROMA is UB/φ+VW/90.

Checking on the CHROMA column, the chrominance and the burst signals phase and amplitude as produced by this invention matches the requirements 4, 5, and 6 in Table 1.

In the CSCLK column of Table 3, the data shown there indicates that the sampling clock signal CSCLK for chrominance processing is different under different conditions of the composite chrominance signal.

When ALT=0, the signal CHROMA only contains composite chrominance signals having 0°, 90°, 180° and 270° phase angles. Therefore, the signal CSCLK utilizes quadruple-frequency subcarrier signal CCLK generates 0°, 90°, 180°, and 270° phase angles as sampling signal.

Accordingly in FIG. 2, the signal CHROMA, after being sampling processed by the signal CCLK in the bandpass filter 59 has an unchanged phase relation between the burst and the chrominance after sampling. As shown in Table 3, the phase angle of CHROMA is the same as that of BLCHROMA.

When ALT=1, the signal CHROMA contains burst signals having phase angles in the series 45°, 135°, 225°, and 315° and chrominance signals having phase angles in the series 0°, 90°, 180°, and 270°. Consequently, the signal CSCLK utilizes quadruple-frequency signal BCLK that generates phase angles in the series 45°, 135°, 225°, and 315° as the sampling signal; whereas during the period of image display, it utilized quadruple-frequency signal CCLK that generates phase angles in the series 0°, 90°, 180°, and 270° as the sampling signal. In this way, the signal BLCHROMA can maintain consistent phase angle in match with the phase angle of the signal CHROMA before sampling. Otherwise, if sampling is performed using different series of phase angles, the sampled composite chrominance signal will cause infidelity in the regeneration of colors.

In FIG. 2, a phase-locked loop (PLL) circuit 300 is formed by a phase detector 114, a voltage-controlled oscillator (VCO) 115, and a divide-by four frequency divider 116 in the game machine 50a, and a horizontal synchronization signal generator 117. The purpose of this PLL circuit 300 is to allow the whole system, including the game machine 50a and multi-standard video signal encoder 50b, to employ only one single crystal chip Y1. This benefits not only system cost reduction, but also image quality enhancement.

The variable frequency divider 113 utilizes the quadruple-frequency subcarrier signal 4FSC generated by the four-quadrant subcarrier signal generator 112 as its clock signal. The divisor for the internal counter is determined by the settings of the jump lines FH1 and FHφ connected with Pin 2 and Pin 3. The output of the variable frequency divider 113 is HSREF, which is input to the phase detector 114 to be used as a reference signal in the PLL circuit 300. Suppose that the divisor in the variable frequency divider 113 is N, the frequency of the horizontal phase-lock reference signal HSREF is:

$$F_{HSREF}=4FSC/N \quad (9)$$

where the value of N is determined by settings of the jump lines FHo and FH1. The actual values are disclosed in Table 4. From the HSREF row of Table 4, it can be clearly seen that the selection of the value of N is primarily for the purpose of matching the frequency of the horizontal phase-lock reference signal HSREF completely or at least closely with the frequency specified by the respective TV system standards, as shown in Table 1.

In FIG. 2, the output SYSCLK of the voltage-controlled oscillator 115 in the PLL circuit 300 is the clock signal used by the game machine 50a. In the game machine, the system clock signal SYSCLK, after being divided by four in the frequency divider 116, is transformed into a clock signal designated as SCLK. The signal SCLK, besides being used internally in the game machine 50a, is also used as the sampling clock signal for the multi-standard composite video signal encoder 50b. For example, it is used in the RGB-to-YUV converter 51, in the luminance signal low-pass filter 56, in the time-matching circuit 58, and in the second digital-to-analog converter 110 for the luminance signal. Since sampling clock signals SCLK and CSCLK required by the composite luminance signal YS and the composite chrominance signal CHROMA are different in frequency, the two signals cannot be summed up in the form of a digital signal. Accordingly in the encoder 50b of present invention, the composite luminance signal YS and the composite chrominance signal CHROMA are respectively converted by a pair of digital-to-analog converters 110, 111 respectively into analog composite luminance and analog composite chrominance signals. Then the two analog signals are summed up into an analog composite video signal. In cooperation with the switch S1 shown in FIG. 2, it can provide SVHS with separation of luminance and chrominance signals for use in the TV set.

The horizontal synchronization signal generator 117, which is incorporated in the PLL circuit 300 and arranged in the game machine 50A, utilizes the signal SCLK as its clock signal. After being divided by 855, the resulting horizontal reference signal HREF is sent into the vertical synchronization signal generator 118 to be used there as a clock signal. Besides, in the horizontal synchronization signal generator 117, the generated horizontal synchronization signal HS is sent into the other input port of the phase detector 114. The frequency of the horizontal synchronization signal HS is:

$$F_{HS}=F_{SYSCLK}/4\times855 \quad (10)$$

In the phase detector 114, the horizontal synchronization signal HS is compared in frequency and phase with the horizontal phase-lock reference signal HSREF. The output error signal is sent into a low-pass filter composed of the resistor RA and the capacitor C1 coupled to Pin 1.

The output of the low-pass filter is the remedy voltage VE used as the input to the voltage-controlled oscillator 115. Consequently, the frequencies of the signals SYSCLK and HS vary as the voltage VE varies. The purpose of such variation is to allow a complete frequency and phase match between the horizontal synchronization signal HS and the horizontal phase-lock reference signal HSREF, with errors only in static phases. Since after being phase-locked, the frequencies of the two signals are the same, Eq. (9) and Eq. (10) can be combined into the following.

$$F_{SYSCLK} = 3420/N * 4FSC \qquad (11)$$

From Eq. (11), the frequencies of the signal SYSCLK for the standards of the different TV systems can be computed. The result is shown in the SYSCLK row of Table 4. The frequencies vary in the range from 53.438 MHZ to 53.817 MHZ. The range of variation is very small so that the tolerance requirement in the voltage-controlled oscillator 115 can be easily satisfied.

In Table 4, the FSC/HS row lists ratios of the frequency of the chrominance subcarrier signal FSC to that of the horizontal synchronization signal HS. These values comply with the requirements of each TV system standards, so that interference caused by the chrominance subcarrier signal on the screen can be reduced.

In FIG. 2, the vertical synchronization signal generator 118 in the game machine 50a utilizes the horizontal reference signal HREF as its clock signal. The frequencies of the vertical synchronization signal VS and the vertical blanking signal VBLK are controlled by the 50/60B control line. The 50/60B control line is in turn controlled by the jump line FH1.

The setting of the jump line FH1 determines a divisor M of either 262 or 312 for the vertical synchronization signal generator 118. The frequency of vertical synchronization signal can be calculated using the following equation:

$$F_V = F_H/M \qquad (12)$$

Vertical frequency values calculated in accordance with Eq. (12) are listed in the VS row of Table 4. Compared to the vertical frequency values listed in Table 1 for each TV system standard, there exist minor errors. The errors come from interlaced scanning or non-interlaced scanning.

In Table 1, the listed vertical frequency values are obtained by dividing the original frequency with 262.5 or 312.5 in interlaced scanning; whereas the listed vertical frequency values in Table 4 are obtained by dividing the original frequency with 262 or 312 in non-interlaced scanning. Non-interlaced scanning is commonly used in TV game machines. With it, memory space for storing video data can be reduced in half.

TABLE 1

|   |   | NTSC-M | NTSC-4.43/60 | NTSC-4.43/50 | PAL-B/G/I/D | PAL-M | PAL-N |
|---|---|---|---|---|---|---|---|
| 1. Vertical scanning frequency | Hz | 59.94 | 59.94 | 50 | 50 | 59.94 | 50 |
| 2. Horizontal Scanning Frequency | Hz | 15734.26 | 15734.26 | 15625 | 15625 | 15734.26 | 15625 |
| 3. Frequency of Sub-carrier | MHz | 3.579545 | 4.433619 | 4.433619 | 4.433619 | 3.575611 | 3.582062 |
| 4. Phase angle of color signal | Degree | 180 | 180 | 180 | 135/225 | 135/225 | 135/225 |
| 5. Phase angle of U sub-carrier | Degree | 0 | 0 | 0 | 0 | 0 | 0 |
| 6. Phase angle of V sub-carrier | Degree | 90 | 90 | 90 | 90/270 | 90/270 | 90/270 |

TABLE 2

|   | NTSC-M | NTSC-4.43/60 | NTSC-4.43/50 | PAL-B/G/I/D | PAL-M | PAL-N |
|---|---|---|---|---|---|---|
| Y1 | 14.31818 | 17.734476 | 17.734476 | 17.734476 | 14.302444 | 14.302444 |
| ALT | φ | φ | φ | 1 | 1 | 1 |
| FH1 | φ | φ | 1 | 1 | φ | 1 |
| FHφ | φ | 1 | φ | φ | φ | 1 |

Note:
φ = Open (disconnected);
1 = Closed (connected)

TABLE 3

| ALT | CBLKB | 211 | BSUBP | BSUBM | RSUBP | RSUBM | UB | VW | CHROMA | CSLCK | BLCHROMA |
|---|---|---|---|---|---|---|---|---|---|---|---|
| 0 | 0 | X | 180 | 0 | 90 | 270 | 0 | 0 | 0 | CCLK | 0 |
|   |   |   |   |   |   |   | +8 | 0 | 16/180 |   | 16/180 |
| 0 | 1 | X | 0 | 180 | 90 | 270 | UB | VW | UB/0+ | CCLK | UB/0+ |

TABLE 3-continued

| ALT | CBLKB | 211 | BSUBP | BSUBM | RSUBP | RSUBM | UB | VW | CHROMA | CSLCK | BLCHROMA |
|---|---|---|---|---|---|---|---|---|---|---|---|
| 1 | 0 | 0 | 225 | 45 | 270 | 90 | 0<br>+8 | 0<br>0 | VW/90<br>0<br>16/225 | BCLK | VW/90<br>0<br>16/225 |
| 1 | 1 | 0 | 0 | 180 | 270 | 90 | UB | VW | UB/0+<br>VW/270 | CCLK | UB/0+<br>VW/270 |
| 1 | 0 | 1 | 135 | 315 | 90 | 270 | 0<br>+8 | 0<br>0 | 0<br>16/135 | BCLK | 0<br>16/135 |
| 1 | 1 | 1 | 0 | 180 | 90 | 270 | UB | VW | UB/0+<br>VW/90 | CCLK | UB/0+<br>VW/90 |

TABLE 4

|  | NTSC-M | NTSC-4.43/60 | NTSC-4.43/50 | PAL-B/G/I/D | PAL-M | PAL-N |
|---|---|---|---|---|---|---|
| 4FSC = Y1 (MHZ) | 14.31818 | 17.734476 | 17.734476 | 17.734476 | 14.30244 | 14.30244 |
| FH1 | 0 | 0 | 1 | 1 | 0 | 1 |
| FHφ | 0 | 1 | 0 | 0 | 0 | 1 |
| N | 910 | 1127 | 1135 | 1135 | 910 | 917 |
| HSREF (HZ) | 15734.26 | 15736.00 | 15625.00 | 16525.00 | 15716.97 | 15625.13 |
| SYSCLK (MHZ) | 53.811 | 53.817 | 53.438 | 53.438 | 53.752 | 53.438 |
| FSC/HS | 227.5 | 281.75 | 283.75 | 283.75 | 227.5 | 229.25 |
| M | 262 | 262 | 312 | 312 | 262 | 312 |
| VS (HZ) | 60.05 | 60.06 | 50.08 | 50.08 | 59.99 | 50.08 |

Note:
0 = open (disconnected),
1 = closed (connected)

What is claimed is:

1. In a digital multi-standard composite video signal encoder for use in a high color resolution TV game machine, part of the encoder being combined with part of the game machine in an integrated circuit and another part of the encoder having peripheral components outside the integrated circuit including:

(1) a crystal oscillator chip, a second capacitor, and three jump lines for selection of any one of NTSC-M, NTSC 4.43/50, NTSC 4.43/60, PAL-B/G/I/D, PAZ-M and PAL-N systems;

(2) a first capacitor of fixed capacitance for use in phase-locked circuit filtering;

(3) a switching circuit and first and second resistors for selection of signals to produce SVHS signals having separation between luminance and chrominance signals or a composite video signal having combined luminance and chrominance signals;

(4) a third resistor for controlling current flow in a digital-to-analog converter;

5) a third capacitor and a fourth capacitor for use as filters in an analog power source; an improvement to the part of the encoder in the integrated circuit, which comprises:

(a) an RGB color difference signal converter that accepts RGB primary color signals generated by the game machine, a negative composite blanking signal, and a video sampling clock signal for converting the RGB signals respectively into a luminance signal, a weighted red color difference signal VW, and a weighted blue color difference signal UW;

(b) one part of a multi-system signal generator for generating four subcarrier signals and a chrominance-sampling clock signal of different quadrants and phases, and generating a horizontal phase-lock reference signal;

(c) a composite chrominance signal generator that combines the weighted red color difference signal and weighted blue color difference signal with a composite color burst gate signal from the game machine and the subcarrier signals for generating a composite chrominance signal containing color burst;

(d) a bandpass filter that accepts the composite chrominance signal for producing a band-limited composite chrominance signal;

(e) a first digital-to-analog converter for converting the band-limited composite chrominance signal into an analog current signal to build up an analog composite chrominance signal on the second resistor;

(f) a composite synchronization signal inserter that accepts the luminance signal for producing a composite luminance signal containing a composite synchronization signal;

(g) a low-pass filter that accepts the composite luminance signal for producing a band-limited composite luminance signal;

(h) a time delay matching device for matching timing between the band-limited composite luminance signal and the band-limited composite chrominance signal;

i) a second digital-to-analog converter for converting the composite luminance signal into an analog current signal to build up an analog composite luminance signal on the first resistor; and (j) a phase-locked loop circuit that uses a horizontal sync signal generated by the game machine for phase-locking with the horizontal phase-lock reference signal, generating a high-frequency clock signal for the game machine and maintaining a fixed ratio between a frequency of the signals and a frequency of the horizontal sync signal whereby to reduce subcarrier interference visability.

2. The encoder as claimed in claim 1, wherein the RGB color difference signal converter comprises:

(a) an RGB-to-YUV converter that accepts the RGB primary color signals, negative composite blanking signal, and video sampling clock signal for concurrently producing a luminance signal Y, a red color difference signal and a blue color difference signal;

b) a V-weighter that multiplies the red color difference signal by a 0.875 weight value for generating a weighted red color difference signal VW; and (c) a U-weighter that multiplies the blue color difference signal by a 0.5 weight value for generating a weighted blue color difference signal UW.

3. The encoder as claimed in claim 2, wherein said RGB-to-YOV converter comprises:

(a) an array of a first AND gate, a second AND gate, and a third AND gate that accept respective RGB signals and collectively accept the negative composite blanking signal for respectively generating blanking processed R, G, and B primary color signals.

(b) first through eighth adders, the first adder having at respective input ports thereof a multiplier by 2 and a multiplier by 8, the second adder having at respective input ports thereof a multiplier by 1 and a multiplier by 2, the third adder having at respective input ports thereof a multiplier by 2 and a multiplier by 4, the fourth adder having at respective input ports thereof a multiplier by 2 and a multiplier by 8 in parallel, the sixth adder having a multiplier by 1 at an input port thereof, the input ports of the first and second adders being coupled to an output port of the first AND gate, the input ports of said third adder being coupled to an output port of the second AND gate, the input ports of said fourth adder being coupled to an output port of the third AND gate, the fifth adder having a first input port and a second input port respectively coupled to output ports of the second adder and the third adder, the sixth adder having a first input port and a second input port respectively coupled to an output port of the fifth adder and the output port of the third AND gate, the seventh adder having a first input port coupled to an output port of the first adder and a second input port, the eighth adder having a first input port and a second input port respectively coupled to the second input port of the seventh adder and an output port of said fourth adder; and (c) an array of a first Q-type flip-flop, a second m-type flip- flop, and a third D-type flip-flop, respectively coupled to output ports of the seventh sixth and said eighth adders for generating the luminance signal Y, the red color difference signal, and the blue color difference signal.

4. The encoder as claimed in claim 3, and further comprising means for synchronizing the luminance signal Y, the red color difference signal, and the blue color different signal with the video sampling clock signal.

5. The encoder as claimed in claim 1, wherein the one part of the multi-system signal generator includes:

(a) a four-quadrant subcarrier signal generator; and (b) a variable frequency divider; and another part of the multi-system signal generator outside the integrated circuit includes:

(a) a resonant circuit consisting of a crystal oscillator chip and the second capacitor coupled to the four-quadrant subcarrier signal generator for generating the chrominance-sampling clock signal at quadruple chrominance subcarrier frequency;

(b) an alternate jump line coupled to said four-quadrant subcarrier signal generator for generating an alternation control signal; and (c) a first jump line and a second jump line coupled to the variable frequency divider for generating a horizontal phase-lock reference signal, the first jump line being capable of changing a divisor and thereby obtaining two vertical synchronization frequencies.

6. The encoder as claimed in claim 5, wherein said four-quadrant subcarrier signal generator comprises:

(a) a first inverter, a second inverter, a third inverter, and a fourth inverter connected in series, the first inverter having an input port and an output port respectively coupled to an input port and an output port of the resonant circuit, the signal generated by the resonant circuit being coupled to an input port of the third inverter;

(b) a ring counter having a port coupled to an output port of the fourth inverter and for accepting a PORSTB signal for generating a group of four subcarrier signals having respective phase angles 315°, 225°, 135°, and 450°;

(c) a set of D-type flip-flops including a fourth m-type flip-flop, a fifth m-type flip-flop, a sixth m-type flip-flop, and a seventh D-type flip-flop respectively accepting the four subcarrier signals for generating another series of four subcarrier signals having respective phase angles of 270°, 180°, 90°, and 0°;

(d) an eighth D-type flip-flop having an reset port coupled to said PORSTB signal and accepting the horizontal sync signal for generating an alternation signal of ½ the frequency of the horizontal sync signal; and (e) a selection circuit accepting the series of subcarrier signals having 270°, 180°, 90°, 0° and 315, 225, 145, 45 phase angles for generating the four four-quadrant subcarrier signals with phase angles to meet PAL and NTSC requirements and, during a blanking period, blue subcarrier signals BSUBP and BSOBM having a phase angle for a burst signal.

7. The encoder as claimed in claim 2, wherein said composite chrominance signal generator comprises:

(a) a burst signal inserter that accepts the weighted blue color difference signal OW and a composite burst gate signal from the game machine, for producing a composite blue color difference and burst gate signal OB; and b) an amplitude modulator that accepts the weighted red color difference signal VW, the composite blue color difference and burst gate signal UB, and the four subcarrier signals for producing a composite chrominance signal.

8. The encoder as claimed in claim 7, wherein said amplitude modulator comprises:

(a) a first 2'S complementor, which accepts the composite blue color difference and burst gate signal UB;

(b) a second 2'S complementor, which accepts the weighted red color difference signal VW;

(c) a first NAND gate, which accepts a negative burst gate appended of the composite blue color difference and burst gate signal UB and a subcarrier signal BSUBP;

(d) a second NAND gate, which accepts a negative of the red color difference signal −VW and a subcarrier signal RSUBM;

(e) a third NAND gate, which accepts the red color difference signal VW and a subcarrier signal RSUBP;

(f) a fourth HAND gate, which accepts the composite burst gate blue color difference and burst gate signal UB and the subcarrier signal BSUBP; and g) a fifth NAND gate coupled to output ports of the first through fourth NAND gates for generating a composite chrominance signal that contains burst signal.

9. The encoder as claimed in claim 1, wherein the switching circuit comprises:

(a) a toggle switch including a first end coupled to the first digital-to-analog converter and a second end having a first contact and a second contact;

(b) wherein the first resistor has a first end coupled to the second digital-to-analog converter and the first contact and a second end that is grounded;

(c) a first terminal having a first end coupled to the first contact and a second end being grounded;

(d) wherein the second resistor has a first end coupled to the second contact and a second end that is grounded; and e) a second terminal having a first end coupled to the second contact and a second end being grounded;

(f) wherein the encoder outputs a video signal with separation of chrominance and luminance signals when the switch is toggled to the second contact, and a composite video signal when the switch is toggled to the first contact.

* * * * *